Oct. 25, 1955   H. ST. PIERRE   2,721,598
TIRE CHAINS
Filed April 10, 1950   2 Sheets-Sheet 1
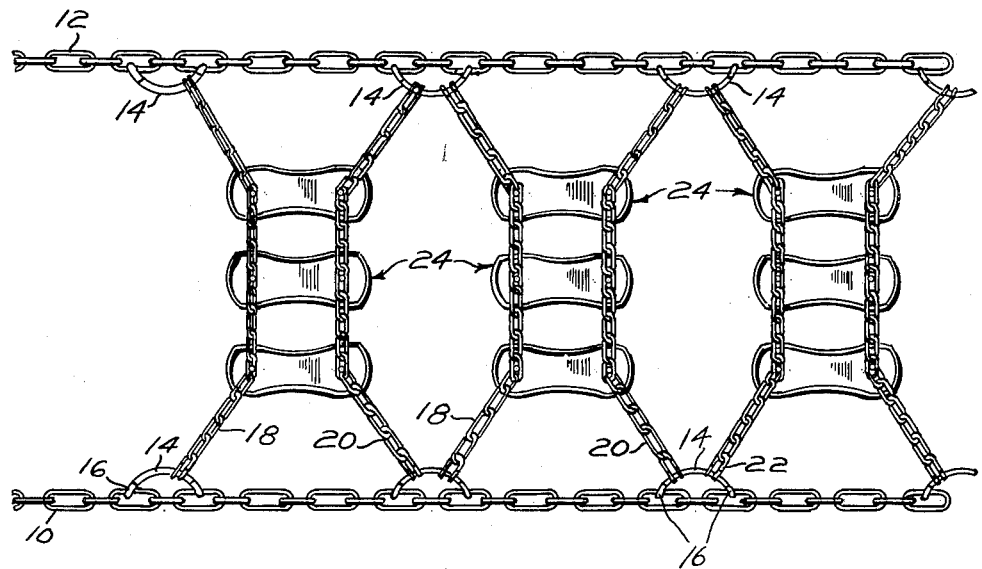
Fig. 1
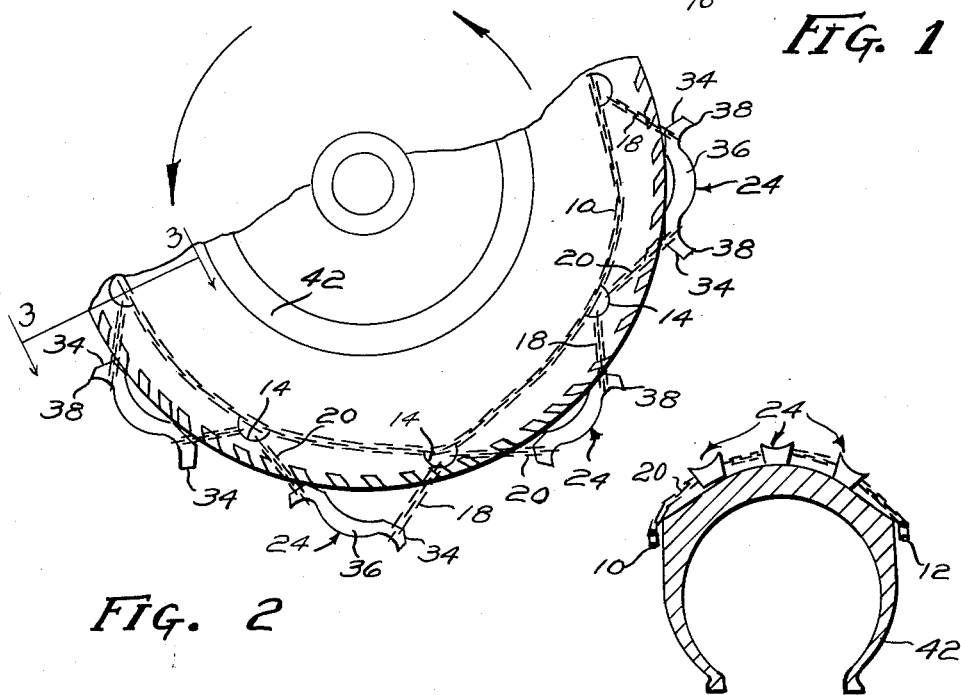
Fig. 2
Fig. 3
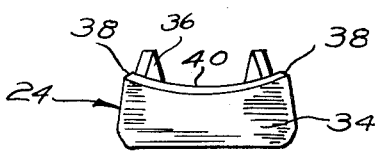
Fig. 8
INVENTOR.
HENRY ST. PIERRE
BY
Charles R. Fay,
ATTORNEY

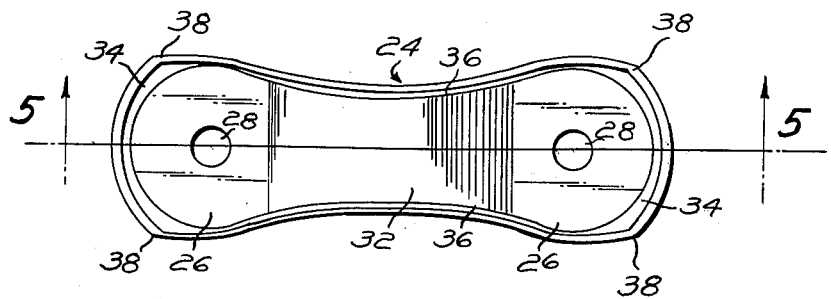
Fig. 4
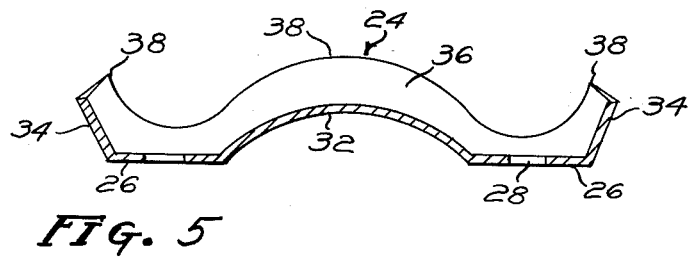
Fig. 5
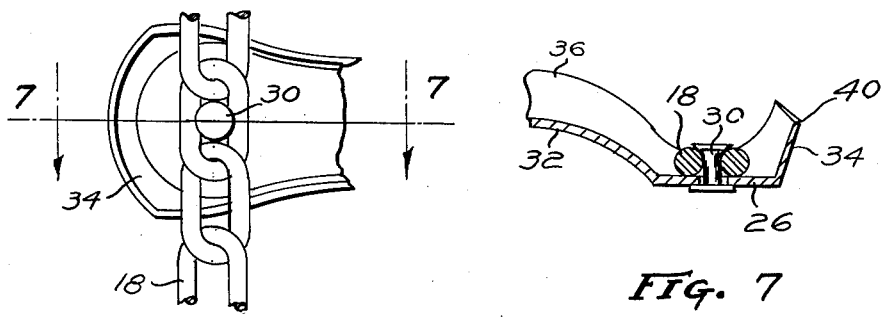
Fig. 6
Fig. 7

United States Patent Office 2,721,598
Patented Oct. 25, 1955

2,721,598

TIRE CHAINS

Henry St. Pierre, Worcester, Mass.

Application April 10, 1950, Serial No. 154,956

4 Claims. (Cl. 152—239)

This invention relates to new and improved tire chains and the principal object of the invention resides in the provision of tire chains having new and improved reinforcing anti-friction devices secured to the cross chains, said devices being of a nature to tilt outwardly away from the tire in the direction of rotation thereof so that if the wheel was mired as for instance either in mud or snow, the said novel devices will tilt outwardly away from the tire and dig into the mud or snow in such a manner as to ensure traction and movement of the vehicle out of its mired position.

Another object of the invention resides in the provision of anti-friction tire chains for vehicles, particularly for, but not limited to, heavy duty types, and including lugs of elongated form which extend parallel to a circumferential line about the tire when the chain is applied thereto, each lug being connected to and between a pair of cross chains and being provided with a raised central part and outwardly inclined end portions forming troughs or the like adjacent the ends thereof in which troughs the ends of each lug being received, the ends of each lug being upturned and extending outwardly away from the tire so as to provide a lip at each end thereof for digging into the ground or snow in such a way as to be forced outwardly away from the tire as above described so that the mud or snow is wedged between the lug and the tire tread, to the end that the vehicle is positively driven out of its mired position.

A further object of the invention resides in the provision of generally heavy duty tire chain provided with lugs as above described, said lugs providing much longer wear and greater traction and at the same time causing a minimum of bumping and noise on clear pavements, the tendency for the lugs to tilt outwardly away from the tire tread failing to occur on cleared pavements and taking place only when the tire is in mud or snow.

Other objects and advantages of the invention will appear hereinafter.

Reference is to be had to the accompanying drawings in which

Fig. 1 illustrates a section of the new tire chain in flat condition;

Fig. 2 illustrates the new tire chain in position on a tire and illustrating the action thereof;

Fig. 3 is a section on line 3—3 of Fig. 2;

Fig. 4 is a top plan view of one of the lugs;

Fig. 5 is a longitudinal sectional view of a lug taken on line 5—5 of Fig. 4;

Fig. 6 is a plan view of one of the lugs illustrating its attachment to the cross chain, part being in section;

Fig. 7 is a section on line 7—7 of Fig. 6, and

Fig. 8 is an end view of a lug.

As shown in Figs. 1 and 2, there is provided a pair of side chains 10 and 12 as is usual. At regularly spaced intervals along the side chains there are provided a series of arc-shaped or semi-circular heavy wire pieces 14 having their ends hooked under certain runs of the links of the side chains, see 16 in Fig. 1, thus fastening the wire pieces 14 to the side chains. Each wire piece 14 has secured thereto a pair of cross chains as at 18, 20, these cross chains being of substantially usual type with hooks 22 at their ends securing the cross chains to the curved wire pieces 14.

The lugs indicated generally at 24 are connected between the cross chain 18 on one wire piece 14 and the cross chain 20 of the next adjacent wire member 14 so that the cross chains assume an X formation as clearly shown in Fig. 1 with the lugs 24 securing the cross chains together in pairs and being located where the members of the X approach each other to make the formation. In Fig. 1 there are shown three of the lugs for each pair of cross chains 18 and 20, but it is to be understood that there could be any number of lugs 24 used, including a single lug or more.

The lugs themselves are shown in detail in Figs. 4–7 inclusive and it will be seen that each lug is of substantially elongated dumbbell formation having a flat portion 26 at each end, these flat portions being formed with apertures 28 for the reception of rivets 30 which when headed over secure the flat portions 26 to a link of the cross chains 18, 20, see particularly Figs. 6 and 7. Between the flats 26 there is provided an arched portion 32 which extends away from the tread of the tire, see Fig. 2; and at each end there is an upstanding portion as at 34 in the nature of a flange which is rounded, see Fig. 4, to conform to the rounded ends of the flat portions 26.

The flanges 34 extend all around the periphery of the lugs particularly in the region of the raised portion 32, see numeral 36. It is these flanges that take most of the wear of the anti-friction lugs and provide the improved traction. The wear is, of course, applied first at the points indicated by the numeral 38, i. e., at the highest points on the flange parts 36 and 34, the latter being curved downwardly as at 40 at the central portion thereof so as to provide the points 38 as best seen in Fig. 8.

Referring now to Fig. 2 it will be seen that with the wheel or tire generally indicated at 42 rotating in the direction of the arrows, the end flanges at 34 will tend to dig down into the mud or snow and will tilt outwardly away from the tire tread. Due to this action, the mud or snow will become wedged or packed in between the lugs and the tire tread and thus it will be seen that traction will clearly and definitely be provided to bring the vehicle out of its mired position.

This action will take place in either direction of rotation of the wheel since the lugs are the same at either end and it will also be seen that the usual looseness of tire chains on a tire will be sufficient to allow this action which, of course, is greater the faster the wheel spins. In other words, it will be recognized that the cross chains of a tire are never so tightly applied to the tire that they cannot move and best practice demands that the chains be loose enough so that they can creep around the tire distributing wear evenly. The tendency for the lugs to tilt outwardly as described above is not present when running on bare pavement or ground because there must be a wedging action on the end flanges 34 to accomplish this purpose, and only loose material as sand, snow, or mud will actuate the lugs in the way described.

Having thus described my invention and the advantages thereof, I do not wish to be limited to the details herein disclosed otherwise than as set forth in the claims, but what I claim is:

1. Tire chain comprising side and connected cross members and lugs secured to the cross members, each lug having flat portions and a substantially surrounding upstanding flange, said flange having high and low areas, the cross members extending transversely of the lugs and lying in the low areas of the flanges across the flat portions, the high flange areas providing ground engaging long wearing traction devices, each lug having a pair of flat portions with a cross member across each flat portion and secured thereto, so that each lug is secured to at least two cross members, and a raised central portion between the two flat portions, the flange extending about the flat portions and along the raised central portion.

2. Tire chain comprising side and connected cross members and lugs secured to the cross members, each lug having flat portions and a substantially surrounding upstanding curved flange, said flange having high and low areas, the cross members extending transversely of the lugs and lying in the low areas across the flat portions, the high flange areas providing ground engaging long wearing traction devices, each lug having a pair of flat portions with a cross member across each flat portion and secured thereto, so that each lug is secured to at least two cross members, and a raised central portion between the two flat portions, the flange extending about the flat portions and along the raised central portion at one side only of each lug, the cross members lying across the lugs at the same side thereof.

3. Tire chain comprising side members and connected cross members, a plurality of elongated lugs secured between each pair of the cross members and lying parallel to the side members, and means on each lug to cause the same to tilt away from the tire when engaged in deep loose ground material, said means comprising an end flange at each end of each lug, the flanges extending away from the tire at an incline and the lugs being arched in the center to extend away from the tire.

4. A tire and tire chain therefor, said chain comprising side and connected cross members, the latter being spaced along the side members, an elongated lug secured to each adjacent pair of cross members, said lugs each being of a length less than the spacing between the cross members, an inclined lip at each end of each lug to cause the leading end of each lug and its adjacent cross member to move away from the tire when the latter is engaged in loose ground material, the inclined lip being located to face in the direction of travel of the tire, and each lug being centrally arched away from the tire to provide a pocket and a pair of fulcrums for each lug in the area of the attachment thereto of the cross members.

References Cited in the file of this patent

UNITED STATES PATENTS

| | | | |
|---|---|---|---|
| 1,095,451 | Clark | May 5, | 1914 |
| 1,157,928 | Duff | Oct. 26, | 1915 |
| 1,270,550 | Poling | June 25, | 1918 |
| 1,371,140 | Bellach | Mar. 8, | 1921 |
| 1,417,130 | Ayers | May 23, | 1922 |
| 1,467,114 | St. Pierre II | Sept. 4, | 1923 |
| 1,480,139 | Anderson | Jan. 8, | 1924 |
| 1,635,017 | Sunde | July 5, | 1927 |
| 1,684,909 | Cady | Sept. 18, | 1928 |
| 1,880,170 | Biffar | Sept. 27, | 1932 |
| 1,952,944 | Ruffertshofer | Mar. 27, | 1934 |
| 2,259,189 | Williams et al. | Oct. 14, | 1941 |
| 2,489,110 | Small | Nov. 22, | 1949 |
| 2,538,046 | St. Pierre | Jan. 16, | 1951 |
| 2,573,092 | Brown | Oct. 30, | 1951 |

FOREIGN PATENTS

| | | | |
|---|---|---|---|
| 46,048 | Sweden | Jan. 28, | 1929 |
| 84,873 | Sweden | Nov. 12, | 1935 |
| 112,503 | Sweden | Sept. 21, | 1944 |
| 274,507 | Italy | Mar. 23, | 1930 |
| 368,398 | Great Britain | Mar. 10, | 1932 |
| 794,492 | France | Dec. 12, | 1935 |